US012472636B2

(12) United States Patent
Gonzalez Aguirre

(10) Patent No.: US 12,472,636 B2
(45) Date of Patent: Nov. 18, 2025

(54) SEGMENTING MULTI-FINGERED SOFT GRIPPER PORTION BASED ON OPTICAL FLOW

(71) Applicant: Intel Corporation, Santa Clara, CA (US)

(72) Inventor: David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 18/344,975

(22) Filed: Jun. 30, 2023

(65) Prior Publication Data

US 2025/0001608 A1    Jan. 2, 2025

(51) Int. Cl.
*B25J 9/16* (2006.01)
*B25J 15/12* (2006.01)
*G06T 7/215* (2017.01)
*G06T 7/80* (2017.01)

(52) U.S. Cl.
CPC ............ *B25J 9/1697* (2013.01); *B25J 15/12* (2013.01); *G06T 7/215* (2017.01); *G06T 7/80* (2017.01); *G06T 2207/10024* (2013.01); *G06T 2207/30241* (2013.01)

(58) Field of Classification Search
None
See application file for complete search history.

(56) References Cited

U.S. PATENT DOCUMENTS

2023/0234233 A1*    7/2023    Goyal ................... G06T 7/269

OTHER PUBLICATIONS

Z. Zhang, et al., "Visual Servoing Control of Soft Robots Based on Finite Element Model", HAL Open Science, 8 pgs., Oct. 20, 2017.
G. Farnebaeck, "Two-Frame Motion Estimation Based on Polynomial Expansion", Computer Vision Laboratory, Linkoeping University, 8 pgs., 2003.

(Continued)

*Primary Examiner* — Thomas E Worden
*Assistant Examiner* — Christopher A Buksa
(74) *Attorney, Agent, or Firm* — Banner & Witcoff Ltd.

(57) ABSTRACT

A robotic system, including: a robot having an arm with a multi-fingered soft gripper that is formed of a compliant material; an image sensor fixedly mounted on the arm to move with the multi-fingered soft gripper, and operable to capture image data of the multi-fingered soft gripper composed of a compliant material; and processor circuitry operable to generate a model of a state of the multi-fingered soft gripper by: controlling the arm to move in a predefined motion pattern while the image sensor captures the image data; deriving an optical flow based on the image data and consecutive arm kinematic and velocity frame states; and segmenting between a multi-fingered soft gripper portion and a background portion of the image data based on the optical flow, wherein static regions of the optical flow represent the multi-fingered soft gripper portion, dynamic regions of the optical flow represent the background portion, and non-coherent regions of the optical flow represent contour between the multi-fingered soft gripper portion and the background portion of the image data.

20 Claims, 7 Drawing Sheets

(56) References Cited

OTHER PUBLICATIONS

Y. Zhang, et al., "Progress, Challenges, and Prospects of Soft Robotics for Space Applications", Advanced Intelligent Systems, 68 pgs, Jun. 30, 2022.
E. Adelson, et al., "Inner Vision: Camera Based Proprioception for Soft Robots", Toyota-CSAIL Joint Research Center, 2 pgs., Jun. 1, 2018.
L. Chin, et al., "A Simple Electric Soft Robotic Gripper with High-Deformation Haptic Feedback," International Conference on Robotics and Automation (ICRA), 7 pgs., May 2019.
Y. She, et al., "Exoskeleton-Covered Soft Finger with Vision-Based Proprioception and Tactile Sensing," IEEE International Conference on Robotics and Automation (ICRA), 7 pgs., Aug. 31, 2020.

* cited by examiner

| FIG 2A | FIG 2B |

300
Smooth Velocity Trajectory for Active Sensing in Dense Optical Flow

FIG 4
400
Active Sensing for
Foreground and Background Segmentation
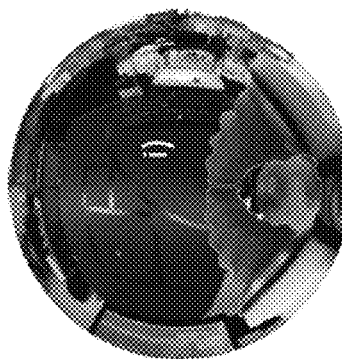
FIG 4I
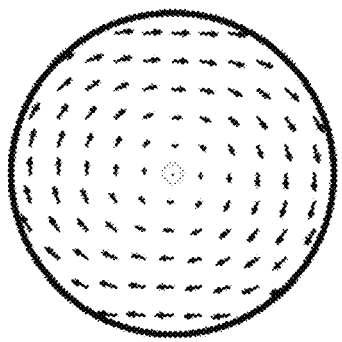
FIG 4G
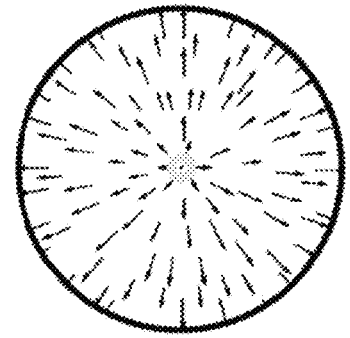
FIG 4H
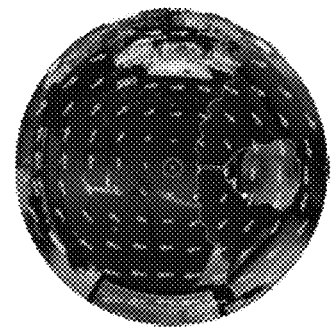
FIG 4E
finger
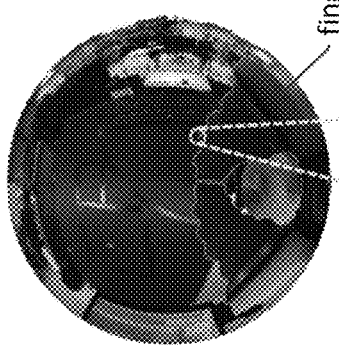
FIG 4B
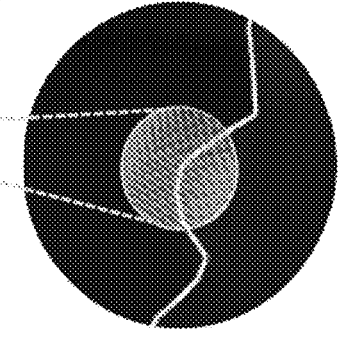
FIG 4F
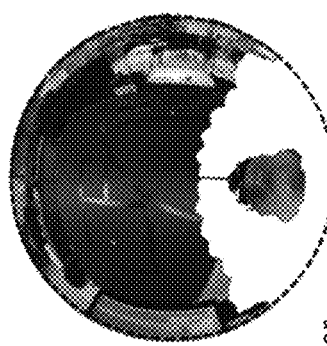
FIG 4A
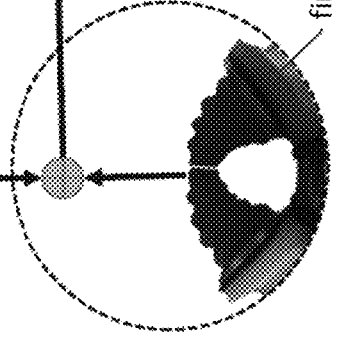
FIG 4D
FIG 4C

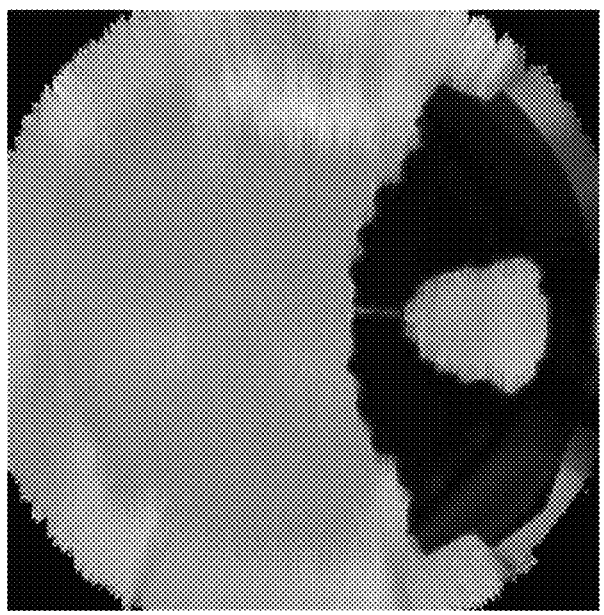
FIG 5 — 500 Total Motion Image

SEGMENTING MULTI-FINGERED SOFT GRIPPER PORTION BASED ON OPTICAL FLOW

TECHNICAL FIELD

The present disclosure is directed to a robotic system, and specifically, to a robotic system segmenting between a multi-fingered soft gripper portion and a background portion of image data based on the optical flow.

BACKGROUND

Soft robots comprise deformable materials such as polymers, fluids, and gels, which enable them to change shape and perform actions. One of the characteristics of soft robots is their compliance-matching properties. Compliance-matching refers to the ability of materials in contact with each other to have similar mechanical rigidity. This property allows for the even distribution of internal load and minimizes stress concentrations at the interfaces between different robot parts.

In the field of industrial automation, the use of soft grippers presents practical challenges in creating cost-effective and precise automation products across various sectors and enterprises of different sizes. One of the major challenges pertains to proprioceptive sensing. Soft grippers lack built-in joint-state encoders due to difficulties arising from the elastic and compressive nature of the materials involved, which can vary over time and during different tasks. Additionally, soft robot fingers exhibit hysteresis and non-stationary behaviors resulting from previous interactions, chamber stress, and object contacts. As a result, achieving reliable proprioception in soft robots remains an unresolved issue.

In industrial automation, modular soft grippers are utilized to handle objects with diverse shapes and compositions, such as in the food industry or with rigid objects. However, due to the absence of finger encoders, achieving precise control in these modular grippers is impractical. Consequently, grasping tasks are limited to power-grasping (binary open/close states) or pinches at the centimeter level. Existing approaches often require the use of image sensors either within the finger or on a separate bench, increasing the cost and fragility of soft grippers for precision tasks and leading to calibration and occlusion issues.

BRIEF DESCRIPTION OF THE FIGURES

FIG. 4 (FIGS. 4A-4I) illustrates a method of active sensing for foreground and background segmentation, in accordance with aspects of the disclosure.

FIG. 5 illustrates a total motion image, in accordance with aspects of the disclosure.

DETAILED DESCRIPTION

The present disclosure is directed to a soft robot that obtains in real time a continuous state of fingers in its multi-fingered soft gripper using a single camera with a wide-angle lens mounted on the robot's palm or wrist. The disclosed aspects provide a millimeter-precise control for grasping and manipulating objects via visual-servoing without the limitations of prior solutions.

I. Overview

Figure 1:
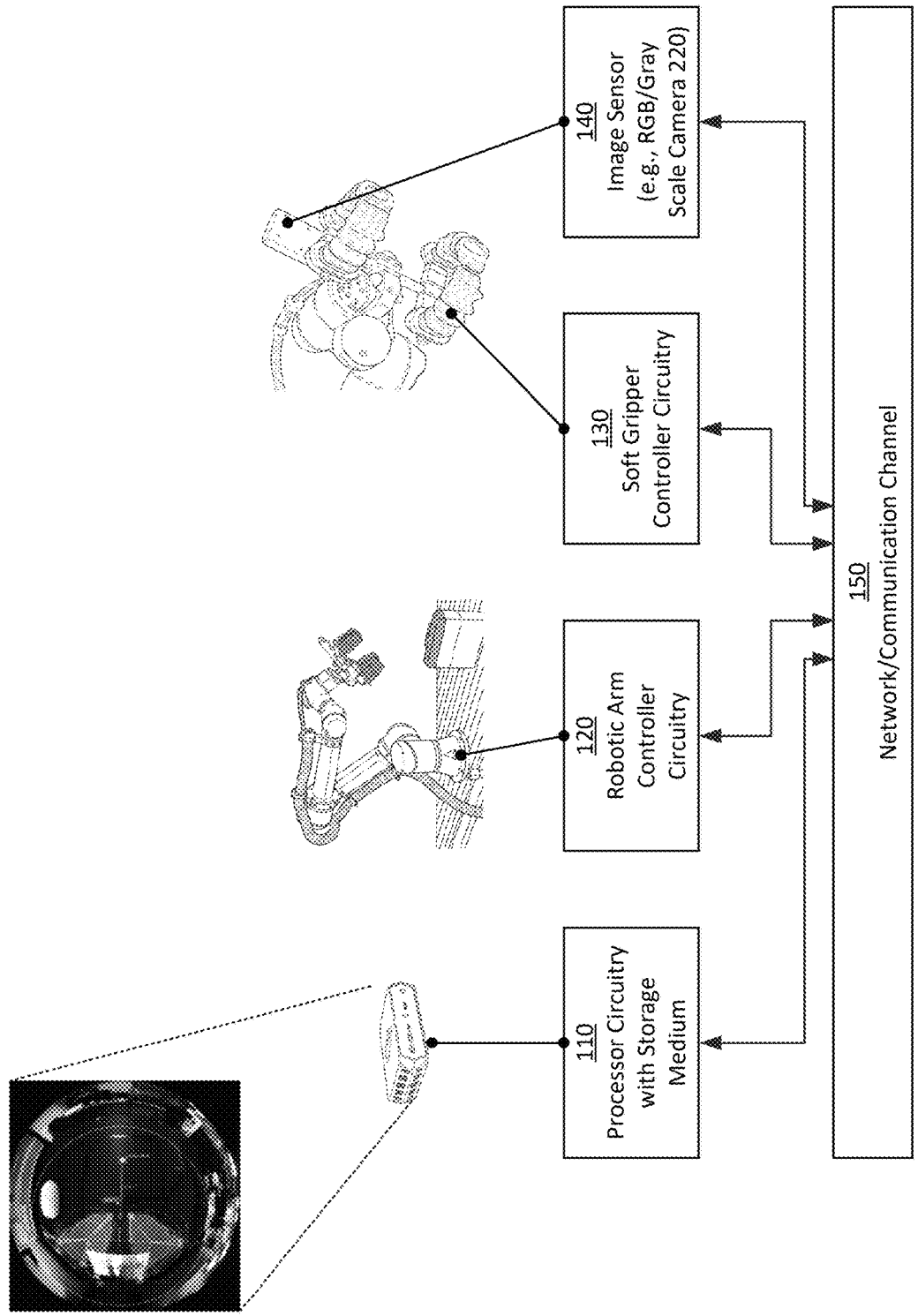
FIG. 1 illustrates a schematic diagram of a soft robotic system, in accordance with aspects of the disclosure.

FIG. 1 illustrates a schematic diagram of a soft robotic system 100, in accordance with aspects of the disclosure.

The soft robotic system 100 comprises processor circuitry 110 with a non-transitory storage medium, robotic arm controller circuitry 120, soft gripper controller circuitry 130, and image sensor 140, and a network/communication channel 150.

The processor circuitry 110 is operable to model a state of a multi-fingered soft gripper of a robot. The robotic arm controller circuitry 120 is operable to control a robotic arm of a robot. The multi-fingered soft gripper controller circuitry 130 is operable to control a multi-fingered soft gripper 210 attached to the robotic arm. In one or more implementations described herein, processor circuitry or controller circuitry can include memory that stores data and/or instructions. "Processor circuitry" as used herein may also generally refer to the processor circuitry 110, the robotic arm controller circuitry 120, and/or the multi-fingered soft gripper controller circuitry 130. The processor circuitry is operable to control the robotic arm with the multi-fingered soft gripper to manipulate an object based on a model of the state of the multi-fingered soft gripper.

The terms "processor," "processor circuitry," "processor circuitry," "controller," or "controller circuitry," as used herein, may be understood as any technological entity that allows the handling of data. The data may be handled according to one or more specific functions executed by the processor, processor circuitry, or controller. Further, processor circuitry, a processor, or a controller as used herein may be understood as any circuit, e.g., any analog or digital circuit. Processor circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, described below in further detail, may also be understood as processor circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processor circuitry detailed herein may be realized as two (or more) separate entities with equivalent functionality or the like.

The image sensor 140 is fixedly mounted on the robotic arm to move with the multi-fingered soft gripper 210 composed of a compliant material, and is operable to capture image data of the multi-fingered soft gripper 210. The image sensor 140 may comprise any number of image acquisition devices and components. The image sensor 140 may include one or more image capture devices (e.g., cameras, CCDs (charge coupling devices), or any other type of image sensor). The camera may be a red, green, blue (RGB)/grayscale camera. The lens 222 of the camera 220 has a field-of-view 224 that is wide. The field-of-view may be, for example, 160-220 degrees. The same image sensor 140 can be used to simultaneously determine finger positions and identify an object.

The "storage medium" or "memory" is a computer-readable medium in which data or information can be stored for retrieval. References to "storage medium" or "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, and data buffers, among others, are also embraced herein by the term memory. The memory can be any well-known volatile and/or non-volatile memory, including read-only memory (ROM), random access memory (RAM), flash memory, magnetic storage media, an optical disc, erasable programmable read-only memory (EPROM), programmable read-only memory (PROM). The memory can be non-removable, removable, or a combination of both.

The network/communication channel 150 may be any wireless and/or wireline communication channel. By way of example, a wireless communication channel may be configured in accordance with a Short Range mobile radio communication standard such as Bluetooth, Zigbee, and the like. As another example, a wireless communication channel may be configured in accordance with a Medium or Wide Range mobile radio communication standard such as a 3G, 4G, or 5G mobile radio communication standard. As a further example, a wireless communication channel may be configured in accordance with a Wireless Local Area Network communication protocol or standard such as IEEE 802.11. A wireline communication channel may be configured in accordance with a standard such as Ethernet (IEEE 802.3), USB (Universal Serial Bus), HDMI (High-Definition Multimedia Interface), Thunderbolt, RS-232, RS-485, and the like.

II. Contactless Proprioception Instrumentation: Imaging and Motion Control

Figures 2, 2A:
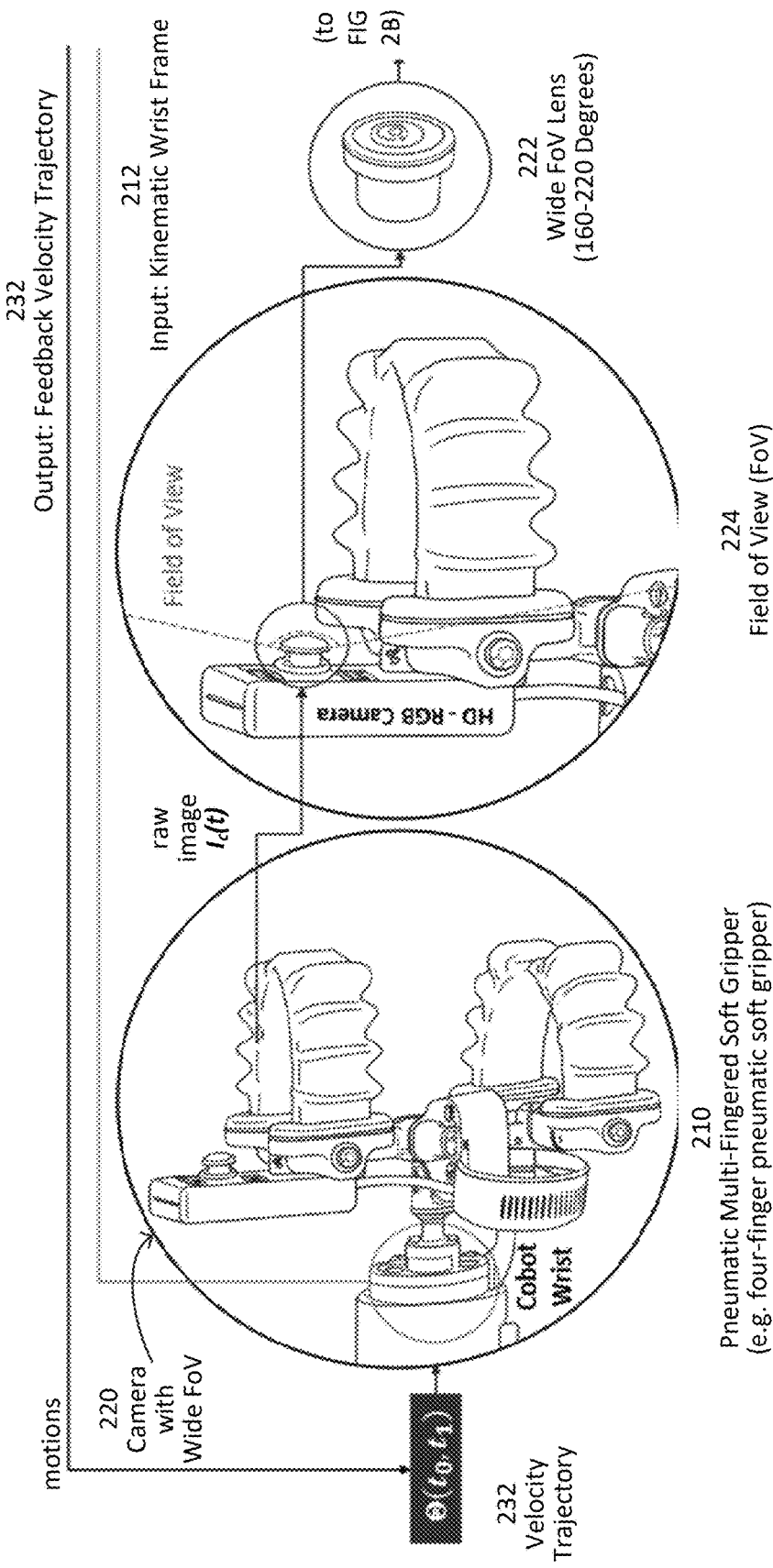
FIG. 2 illustrates a flow diagram of active flow self-segmentation and grasping, in accordance with aspects of the disclosure.
Figure 2B:
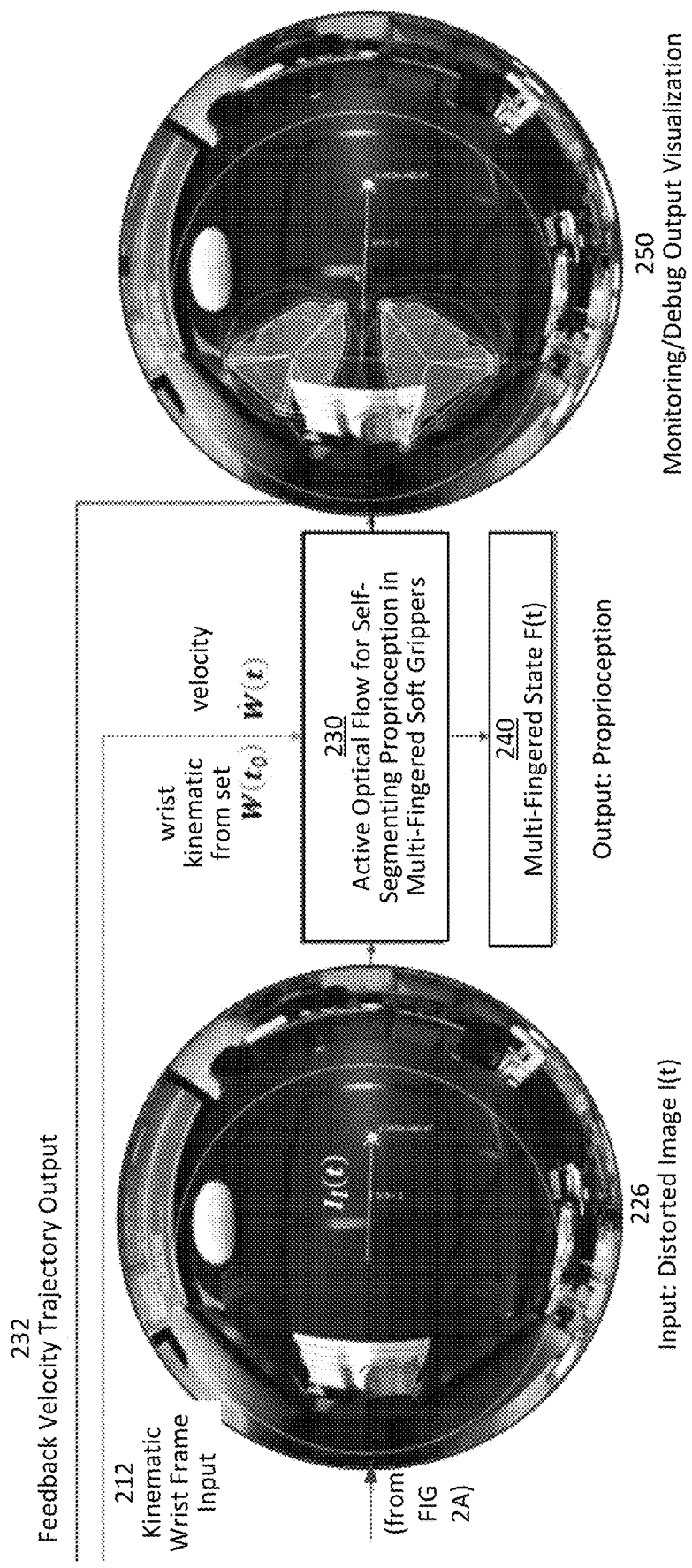

FIG. 2 (comprising FIGS. 2A and 2B) illustrates a flow diagram 200 of active flow self-segmentation and grasping, in accordance with aspects of the disclosure.

By way of overview, flow diagram 200 illustrates instrumentation for active optical flow 230 for self-segmenting and grasping to output a monitoring/debug output visualization 250. A single camera 220 mounted near the multi-fingered soft gripper 210 fully captures the soft fingers from their mounting bases to their tips. The placement of the camera's principal point is directed to the tip of the fingers-pinch configuration when requiring high-precision picking. This minimizes the geometric-compressive distortion close to the fine manipulation image region. This is relevant in visual-servoing tasks where the approaching and closing actions are driven via visual-Jacobian. The wide-angle lens 222 does not need to be calibrated (with respect to optical intrinsic parameters). The method requires inputs: (1) the raw image $I_c(t)$; and (2) the wrist kinematic frame state $W(t)$ and its velocity $\dot{W}(t)$. With these two inputs, the method automatically performs motions $\theta(t_0, t_1)$ (velocity trajectory 232), estimates and publishes the finger's state $F(t)$ 240 for any motion, planning, and control) to exploit the information for and beyond grasping.

First, an RGB camera 220 captures a wide field-of-view 224 encompassing the multi-fingered soft gripper 210. This is a time-variable signal $I_c(t) \mapsto N^3$ whose color information is not exploited for the active optical flow 230. By transforming this color image data into lightness image data or lightness value image data $I_l(t) \mapsto N$ 226, the chromatic dependence is removed. Hence, any color for the multi-fingered soft gripper 210 or background will work similarly second to the continuous state of the multi-fingered soft gripper 210 with respect to its position, orientation, and velocities (linear and angular) for the optical flow 230. This helps to limit the compute to search regions along the camera direction of the motion. This is called the wrist frame 212 and is expressed as $W(t) \mapsto SO^3$ and the associated velocities $\dot{W}(t) \mapsto R^6$, namely a twist. Time synchronization t is ensured via ROS-Crony mechanism and ROS-TF 7D-interpolation capabilities, which are known. Thus, the formal system input a is expressed as:

$$\alpha := [I_l(t), W(t), \dot{W}(t), t] \qquad \text{(Equation 1)}$$

The multi-fingered soft gripper 210 could be designed without fingers or fingertips, such as a spherical shape. It is assumed that the camera 220 and the robotic arm base are fixed, but the fingers themselves are not fixed because they are flexible. Camera 220 may be mounted in different locations (e.g., over one finger or in the center of all fingers), depending on the segment access and the regions of the contact points.

Figure 3:
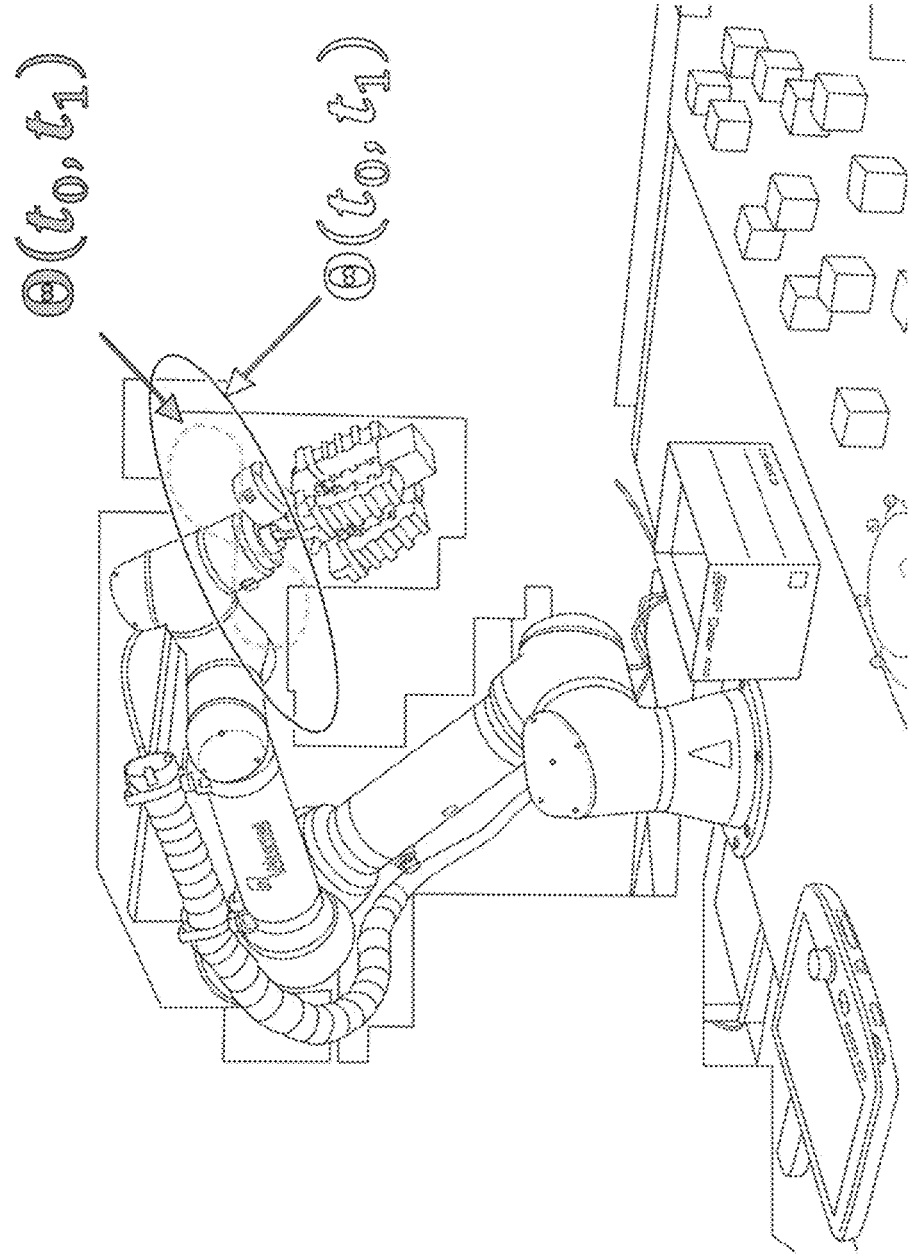
FIG. 3 illustrates a smooth velocity trajectory for active sensing in dense optical flow, in accordance with aspects of the disclosure.

III. Active Image Acquisition: Coordinated Motion for Image Contour Saliency and Segment Stability Detection FIG. 3 illustrates a smooth velocity trajectory 300 for active sensing in dense optical flow, in accordance with aspects of the disclosure.

Active sensing is the process in which a robot can better sense and model its state by purposefully moving the image sensor 120/220 in a predefined motion pattern, while the image sensor 140/220 captures image data, to obtain a better signal that simplifies the perception problem or receives more information. Herein, the robot exploits the fact that the camera 120/220 mounted on the robotic arm or wrist and the multi-fingered soft gripper 210 will move similarly. Hence, the difference between foreground and background is exposed in the images by controlled motion. Formally, this means there is that visual mapping $$\Gamma(W(t)) \mapsto I_l(t) \qquad \text{(Equation 2)}$$

process $\Gamma$, which produces certain image data as the input of a wrist frame 212. Since it is possible to control the robotic arm in velocity mode, the velocities $\dot{W}(t)$ may be set as a closed-loop trajectory:

$$\Theta(t_0, t_1) = \int_{t=t_0}^{t_1} \left(W(t_0) \oplus \dot{W}(t)\right) \delta t = W(t_0), \qquad \text{(Equation 3)}$$

(where $\oplus$ composes frame and twist) including translations and rotations of the image plane, as shown in FIG. 3. $W(t_0)$ is the instantaneous position at the start of the motion. Such motion aims to provide enough distinctive variations of the image data to detect dependable external borders of the soft fingers concerning the background. The shape of the velocity trajectory $\theta(t_0, t_1)$ 232 goes from a simple circular profile to a multi-loop depending on the multi-fingered soft gripper's shape, fingers, and complexity. In practice, figure-eight motion patterns (see FIG. 3) will work for most applications assuming diversity of image content in the background. In applications where the background lacks texture, patches with texture can be retro-projected to the image plane and used in a scanning fashion to ensure visual gradients around the borders. This mitigation strategy leads to easy detectability. The specific trajectory can be either planned or randomly selected. The invariant is that the acquisition ensures enough variation to detect segments and contours as described in the following sections. Finally, accelerations are kept as minimal as possible to avoid blur and shaking motions of the fingers.

IV. Motion-Biased Quasi-Dense Optical Flow

FIG. 4 (comprising FIGS. 4A-4I) illustrates a method 400 of active sensing for foreground and background segmentation, in accordance with aspects of the disclosure.

FIG. 4A illustrates optical flow derived by rotation around the camera's optical axis.

FIG. 4B illustrates the flow of the image data using the pattern of FIG. 4A.

FIG. 4C illustrates optical flow derived from translational motion along the camera's optical axis. FIG. 4D illustrates the flow of the image data using the pattern in FIG. 4C.

FIG. 4E illustrates that the static regions with respect to optical flow are the segments of the multi-fingered soft gripper (fingers and robotic arm). The zoom region (denoted by the circle) shows dense flow patterns close to the contour area and small inside the fingers. FIG. 4F illustrates the contour or border zone where the optical flow exposes abrupt edges in flow and magnitude. This flow cue reliably separates the moving area from areas that are not moving.

FIG. 4G illustrates that how regions exposing a minimal optical flow with accumulation (sum of vector magnitudes) are considered scene content and labeled pixel-wise as background (shown in dark). Conversely, FIG. 4H regions not varying enough with respect to motion accumulator $\chi_{T([x,y])}$, are considered foreground or soft gripper pixels (shown in dark). Finally, FIG. 4I illustrates a combination of FIGS. 4G and 4H. The two segmentation classes expose non-convex regions with excellent detail. To remove speckles from over-segmentation, a simple morphological erosion and dilatation (aperture filter) cleans the speckles of the process, providing reliable segments in a computationally efficient manner.

Optical flow is the pattern of apparent motion of objects between two or more consecutive images. This is caused by the motion of objects, a camera 140/220, or both. Considering the intensity image $I_l(x,y,t)$, where x and y are the pixel coordinates at time t, then after an object in the image moves in the small interval ($|[\delta x, \delta y]|<\varepsilon$) without drastic immediate changes in the vantage point, it is possible to consider:

$$I_l(x, y, t) \approx I_l(x + \delta x, y + \delta y, t + \delta t). \quad \text{(Equation 4)}$$

$\varepsilon$ is a pixel distance, which is proportional to the expected velocity and inversely to the background depth. The smaller the value, the more linearized is the motion leading to better results. However, small values require more computational power, which is particularly significant in dense flow for high resolution images.

The Taylor approximation of the first order for the right side is expressed as:

$$\frac{\delta I_l}{\delta x} \cdot \delta x + \frac{\delta I_l}{\delta y} \cdot \delta y + \frac{\delta I_l}{\delta t} \cdot \delta t = 0. \quad \text{(Equation 5)}$$

Then the optical flow formulation can be now obtained by dividing this expression by $\delta t$, namely:

$$\frac{\delta I_l}{\delta x} \cdot u + \frac{\delta I_l}{\delta y} \cdot v + \frac{\delta I_l}{\delta t} = 0, \quad \text{Equation 6)}$$

I,s where $$u = \frac{\delta x}{\delta t},$$

and $$v = \frac{\delta x}{\delta t}$$

are in pixel per second. This formulation [u,v] is the linear motion velocity vector, $$\frac{\delta I_l}{\delta x}$$

is the (quasi-static) horizontal image gradient around the pixel. Similarly, $$\frac{\delta I_l}{\delta y}$$

is the vertical quasi-static gradient.

Known dense methods estimate the [u,v] model the underlying image patch as a polynomial surface and search around neighbors in a zone to decide the best match. On the other hand, the aspects of this disclosure dramatically reduce the computation by introducing the information about the expected motion $\dot{W}(t)$, namely the effect of the dynamic frame $W(t_0) \oplus \dot{W}(t)$ on the camera.

This is modeled as a range coming from a predefined depth range $[D_0, D_1]$, which is usually between 10-50 cm for grasping approaching and closing. This is formally expressed as:

$$K(W(t_0) \oplus \dot{W}(t), [D_0, D_1]) \mapsto [\beta_0, \beta_1] \subset R^2, \quad \text{(Equation 7)}$$

where $[\beta_0, \beta_1]$ define the minimal and maximal length of the displacement in pixels for the $[D_0, D_1]$ input range. How far the objects in the image are from the image sensor 140/220 is considered. A distance in which a pixel varies for something that is very away is much less than for a pixel that is near. Finally, because K informs the range in pixels where the search windows will make motion sense, it significantly reduces the computation resources while increasing robustness the of the results. In the same manner, it is also possible to model direction via a unitary vector Y for the optical flow displacement, namely:

$$\Omega(W(t_0) \oplus \dot{W}(t)) \mapsto Y \subset R^2 \wedge |Y| = 1. \quad \text{(Equation 8)}$$

This biased subpixel linear search provides further optimization with narrow-bounded ranges in dense optical flow. This is technically and mathematically possible due to the a priori kinematic knowledge $W(t_0) \oplus \dot{W}(t)$ and bias of the spatial range $[D_0, D_1]$. A last efficiency concept for semi-dense optical flow with prior knowledge is the fact that regardless of the color or texture of the material of the multi-fingered soft gripper 210, limited pixels whose gradient magnitude is salient enough will produce reliable results. Hence, limiting to those pixels whose local region exposes a motion gradient magnitude:

$$\left\| \left[ \frac{\delta I_l}{\delta x}, \frac{\delta I_l}{\delta y} \right] \right\| > \lambda \quad \text{(Equation 9)}$$

above a predetermined stability threshold $\lambda$ will be computed. This is for the optical flow equation to have a meaningful solution. It also reduces the computational load without sacrificing the precision of the vector field. The dense optical flow map is written as:

$$\psi([x, y], Y, [\beta_0, \beta_1]) \mapsto \{[u, v] \cup \emptyset\}, \quad \text{(Equation 10)}$$

and supplies the displacement vector $\oplus_0 \leq |[u,v]| \leq \beta_1$ or $\emptyset$ if the pixel [x,y] does not have enough gradient for stable flow search computations.

V. Active Flow-Based Segmentation and Contouring

Figure 6:
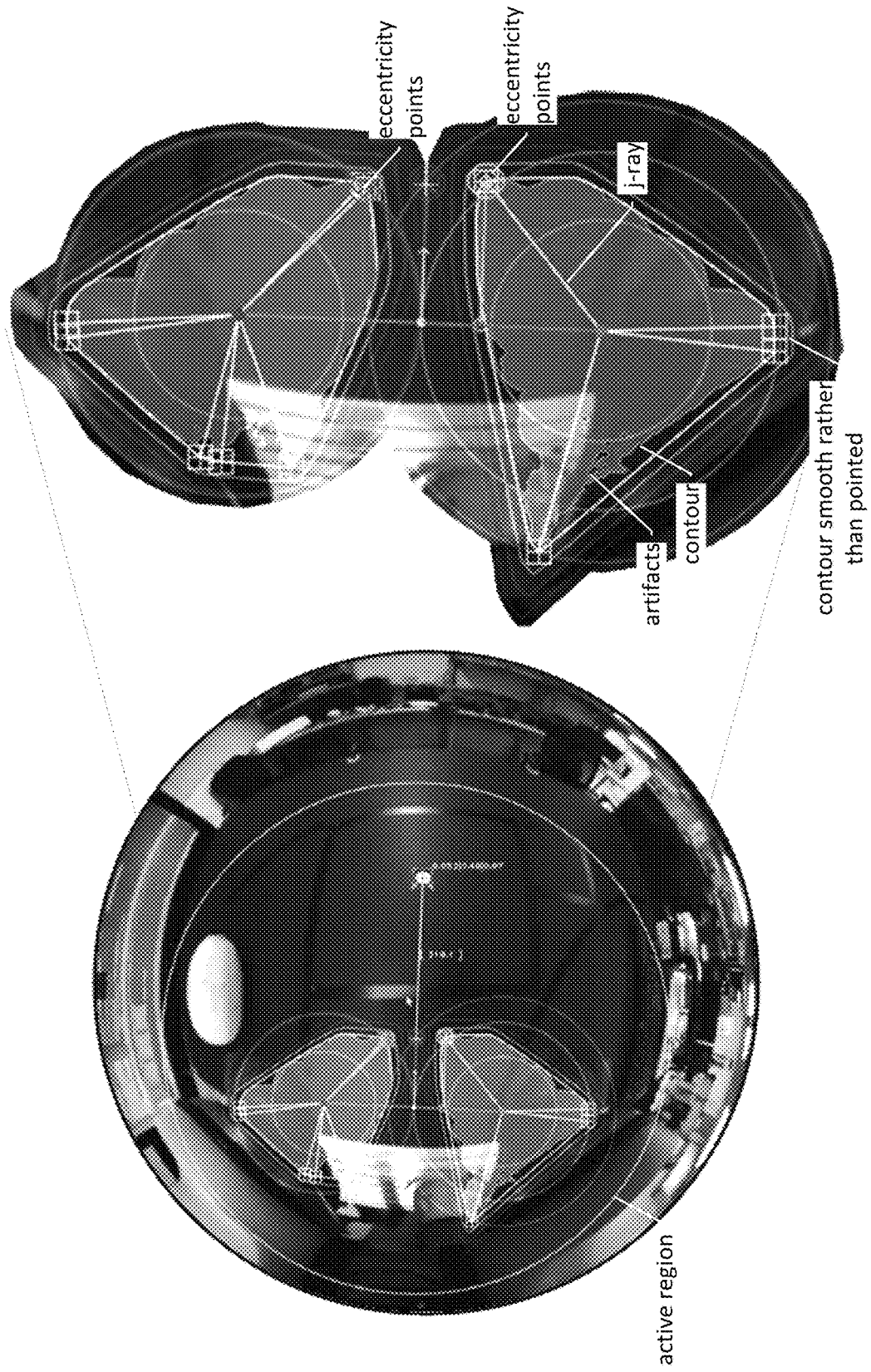
FIG. 6 illustrates finger segmentation and contour analysis for active finger modeling, in accordance with aspects of the disclosure.

FIG. 5 illustrates a total motion image 500, in accordance with aspects of the disclosure. FIG. 6 illustrates fingers segmentation and contour analysis 600 for active finger modeling, in accordance with aspects of the disclosure.

Exploiting motion cues for segmentation makes the algorithm invariant to image content. In the flow-based segmentation, the variation of motions (as in FIGS. 4A and 4C) enables collection vectors for all regions, including those that are disjoint. Moreover, by computing multiple images in the motion, it is possible to supply results invariant to the background if there is a slight variance in the intensity. The discrete total motion for a pixel $\chi_{T([x,y])} \mapsto R$ is defined as the sum of the magnitude of the motion vector along the trajectory $(\theta(t_0, t_1)$ see FIG. 5). Thus, the integral expression sought to segment the image into two classes is:

$$\underset{\chi_{(T([x,y])})}{\text{Discrete Total Motion}} \qquad \underset{\text{Camera-to-scene depth range}}{\qquad}$$
$$\chi_{(T([x,y])}) = \sum_{i=0}^{n} |\psi_{i([x,y],\Omega(W(t_0) \oplus \dot{W}(t_i)), K(W(t_0) \oplus \dot{W}(t_i),[D_0,D_1]))}|.$$
$$\underset{\text{Discrete Motion Integral}}{\underset{\text{at n samples}}{}} \quad \underset{\psi \text{ Active Optical-flow}}{\Omega \text{ Expected Direction of Flo, K Search Range of Flow}}$$
(Equation 11)

Equation 11's binarized version $\hat{\chi}_{T([x,y])}$ is used to segment the deformable blobs describing the fingers of the multi-fingered soft gripper 210. These are freeform two-dimensional shapes. It is noted that the finger's base is still within these blobs. The idea to remove the non-active elements of the multi-fingered soft gripper (base and hoses) 210 is straightforward using the same approach for $\hat{\chi}_T$, with a difference being that the motion is obtained by opening and closing the soft fingers while applying maximal aperture and maximal force in the one state and minimal aperture and no force. This ensures the full range of deformation of the soft fingers. Naturally the rigid base of the multi-fingered soft gripper 210 remains static. FIG. 6 illustrates the result in finger blobs thoroughly segmented from any other element. The external contour of each of these blob, denoted as $\Pi_i(t)$, is a chain coded contour.

VI. Deformable Multi-Segmented Active Model

For each contour $\Pi_i(t)$ denoting a finger at time t, it is possible to compute its convex hull $H(\Pi_i(t)) \subset \Pi_i(t)$. These subsets of points explicitly define j-rays $\Delta_{j,i(H(\Pi_i(t)) \subset \Pi_i(t))}$ connecting the center of mass of the blob and the hull points, as illustrated in FIG. 6. Finally, for, ach finger blob $\Pi_i(t)$ there is a ray $\Delta_{j,i}$, which exposes the maximal variation across aperture values of the gripper. These salient ray features are stable with respect to behavior across actions and six-dimensional pose configurations. To increase robustness, contour smoothing is applied. The upper finger of FIG. 6 shows this smoothing effect while selecting the best ray from two in proximity. Due to the continuous nature of the contour and salient ray, the position is subpixel precise, and the resolution close to these regions is high. The tip contact points are therefore determinable with submillimeter accuracy.

Soft robots' compliance-matching properties provide them with various advantages. These include the capability for rapid and robust grasping, as they can adapt their shape to the objects they interact with, enabling stable and dexterous manipulation skills. Moreover, soft robots exhibit effortless passive impedance, allowing them to absorb collisions and smoothly slide during misalignments, making them resilient to program and execution errors. Additionally, soft robots are multifunctional, as they are suitable for physical interactions in wet, dirty, and taut environments, with tunable softness for both objects and humans. They offer significant cost savings compared to rigid robots; this is due to their efficient energy actuation, inexpensive part replacement, heavy-duty capabilities, and ease of operation.

The disclosed aspects pertain to obtaining real-time, continuous finger state information in soft grippers using a single camera equipped with a wide angle lens mounted on the robot's palm or wrist. This innovative solution enables heavy-duty and cost-effective automation by providing millimeter precision, industrial-grade, vision-based closed-loop control for grasping and manipulating a wide range of objects.

A technology employed is the utilization of active optical flow for self-segmentation. By leveraging active sensing capabilities, soft grippers mounted on robot arms can extract segmentation regions and contours of objects, independent of background appearance. The system creates a non-stationary deformable gripper model using these visual cues and continuously measures them at the frame rate.

Furthermore, millimeter-level grasping tasks are reliably achieved, without requiring camera calibration. And there are no restrictions on the gripper's shape, material, workspace, or the robot's motion capabilities.

The implementation on a CPU delivers real-time performance by utilizing inexpensive high definition (HD) cameras operating at 20 frames per second (fps). This enables the system to exhibit precision (e.g., grasping and inserting coins), power (e.g., lifting heavy foods), and delicacy (e.g., picking raspberries without causing damage).

The disclosed aspects offer scalability and generalization without the need for (re)training the model. This is achieved through an online adaptation process that efficiently avoids re-tuning artificial neural networks (ANNs). The method's validation-capable and explainable nature is made possible by analytic derivation.

The ability to reliably measure the finger state in a soft gripper is fundamental for enabling vision-based flexible grasping and manipulation of objects across various processes. The disclosed aspects effectively address the roadblocks associated with cost effective robot automation in numerous applications, including those involving high-precision tasks. The resulting advantages in productivity, minimal maintenance, and resilience (e.g., collision, twists, and bending) of soft robots directly translate into economic gains for companies. This is particularly significant in situations where the high costs of human employees and their limited availability, especially in industrialized countries, pose an existential threat. Such challenges can be mitigated through AI-based automation.

The techniques of this disclosure may also be described in the following examples.

Example 1. A robotic system, comprising: a robot having an arm with a multi-fingered soft gripper that is formed of a compliant material; an image sensor fixedly mounted on the arm to move with the multi-fingered soft gripper, and operable to capture image data of the multi-fingered soft gripper; and processor circuitry operable to generate a model of a state of the multi-fingered soft gripper by: controlling the arm to move in a predefined motion pattern while the image sensor captures the image data; deriving an optical flow based on the image data and consecutive arm kinematic and velocity frame states; and segmenting between a multi-fingered soft gripper portion and a background portion of the image data based on the optical flow, wherein static regions of the optical flow represent the multi-fingered soft gripper portion, dynamic regions of the optical flow represent the background portion, and non-coherent regions of the optical flow represent contour between the multi-fingered soft gripper portion and the background portion of the image data.

Example 2. The robotic system of example 1, wherein the processor circuitry is further operable to generate the model of the state of the multi-fingered soft gripper by: deriving the optical flow as an active optical flow by limiting the derivation to pixels of the image data that are along a direction of an expected motion and within a predefined depth range from the image sensor.

Example 3. The robotic system of any one or more of examples 1-2, wherein the processor circuitry is further operable to generate the model of the state of the multi-fingered soft gripper by: deriving the active optical flow by limiting the derivation to the pixels of the image data having a motion gradient magnitude that is above a predetermined stability threshold.

Example 4. The robotic system of any one or more of examples 1-3, wherein the processor circuitry is further operable to generate the model of the state of the multi-fingered soft gripper by: determining a discrete total motion for each pixel of the image data by summing a magnitude of a motion vector along a trajectory of the predefined motion pattern; and segmenting pixels of the image data between the multi-fingered soft gripper portion and the background portion of the image data based on the discrete total motions.

Example 5. The robotic system of any one or more of examples 1-4, wherein the processor circuitry is further operable to control the arm with the multi-fingered soft gripper to manipulate an object based on the model of the state of the multi-fingered soft gripper.

Example 6. The robotic system of any one or more of examples 1-5, wherein the predefined motion pattern comprises rotation around an optical axis of the image sensor or translational motion along the optical axis of the image sensor.

Example 7. The robotic system of any one or more of examples 1-6, wherein the predefined motion pattern comprises a figure-eight motion pattern.

Example 8. The robotic system of any one or more of examples 1-7, wherein the image sensor comprises a single camera having a lens with a field-of-view wide enough to capture image data of all fingers of the multi-fingered soft gripper simultaneously.

Example 9. The robotic system of any one or more of examples 1-8, wherein the processor circuitry is further operable to generate the model of the state of the multi-fingered soft gripper by: computing a convex hull for each contour denoting a respective finger of the multi-fingered soft gripper, wherein the convex hull is a subset of points defining rays connecting a center of mass of the respective finger in the image data.

Example 10. The robotic system of any one or more of examples 1-9, wherein the processor circuitry is further operable to generate the model of the state of the multi-fingered soft gripper by: prior to deriving the optical flow, transforming the image data from color image data to lightness value image data.

Example 11. A component of a robotic system, wherein the robotic system includes a robot having an arm with a multi-fingered soft gripper, and an image sensor fixedly mounted on the arm to move with the multi-fingered soft gripper that is formed of a compliant material, and operable to capture image data of the multi-fingered soft gripper, the component comprising: processor circuitry; a non-transitory computer-readable storage medium including instructions that, when executed by the processor circuitry, cause the processor circuitry to generate a model of a state of the multi-fingered soft gripper by: controlling the arm to move in a predefined motion pattern while the image sensor captures the image data; deriving an optical flow based on the image data and consecutive arm kinematic and velocity frame states; and segmenting between a multi-fingered soft gripper portion and a background portion of the image data based on the optical flow, wherein static regions of the optical flow represent the multi-fingered soft gripper portion, dynamic regions of the optical flow represent the background portion, and non-coherent regions of the optical flow represent contour between the multi-fingered soft gripper portion and the background portion of the image data.

Example 12. The component of example 11, wherein the processor circuitry is further operable to generate the model of the state of the multi-fingered soft gripper by: deriving the optical flow as an active optical flow by limiting the derivation to pixels of the image data that are along a direction of an expected motion and within a predefined depth range from the image sensor.

Example 13. The component of any one or more of examples 11-12, wherein the processor circuitry is further operable to generate the model of the state of the multi-fingered soft gripper by: deriving the active optical flow by limiting the derivation to the pixels of the image data having a motion gradient magnitude that is above a predetermined stability threshold.

Example 14. The component of any one or more of examples 11-13, wherein the processor circuitry is further operable to generate the model of the state of the multi-fingered soft gripper by: determining a discrete total motion for each pixel of the image data by summing a magnitude of a motion vector along a trajectory of the predefined motion pattern; and segmenting pixels of the image data between the multi-fingered soft gripper portion and the background portion of the image data based on the discrete total motions.

Example 15. The component of any one or more of examples 11-14, wherein the processor circuitry is further operable to control the arm with the multi-fingered soft gripper to manipulate an object based on the model of the state of the multi-fingered soft gripper.

Example 16. The component of any one or more of examples 11-15, wherein the predefined motion pattern comprises rotation around an optical axis of the image sensor or translational motion along the optical axis of the image sensor.

Example 17. The component of any one or more of examples 11-16, wherein the predefined motion pattern comprises a figure-eight motion pattern.

Example 18. The component of anyone or more of examples 11-17, wherein the image sensor comprises a single camera having a lens with a field-of-view wide enough to capture image data of all fingers of the multi-fingered soft gripper simultaneously.

Example 19. The component of any one or more of examples 11-18, wherein the processor circuitry is further operable to generate the model of the state of the multi-fingered soft gripper by: computing a convex hull for each contour denoting a respective finger of the multi-fingered soft gripper, wherein the convex hull is a subset of points defining rays connecting a center of mass of the respective finger in the image data.

Example 20. The component of any one or more of examples 11-19, wherein the processor circuitry is further operable to generate the model of the state of the multi-fingered soft gripper by: prior to deriving the optical flow, transforming the image data from color image data to lightness value image data.

While the preceding has been described in conjunction with the exemplary aspect, it is understood that "exemplary" is merely meant as an example rather than the best or optimal. Accordingly, the disclosure is intended to cover alternatives, modifications, and equivalents, which may be included within the scope of the disclosure.

Although specific aspects have been illustrated and described herein, it will be appreciated by those of ordinary skill in the art that a variety of alternate and equivalent implementations may be substituted for the specific aspects shown and described without departing from the scope of the present application. This application will cover any adaptations or variations of the aspects discussed herein.

The invention claimed is:

1. A robotic system, comprising:
a robot having an arm with a multi-fingered soft gripper that is formed of a compliant material;
an image sensor fixedly mounted on the arm to move with the multi-fingered soft gripper, and operable to capture image data of the multi-fingered soft gripper; and
processor circuitry operable to generate a model of a state of the multi-fingered soft gripper by:
controlling the arm to move in a predefined motion pattern while the image sensor captures the image data;
deriving an optical flow based on the image data and consecutive arm kinematic and velocity frame states; and
segmenting between a multi-fingered soft gripper portion and a background portion of the image data based on the optical flow, wherein static regions of the optical flow represent the multi-fingered soft gripper portion, dynamic regions of the optical flow represent the background portion, and non-coherent regions of the optical flow represent contour between the multi-fingered soft gripper portion and the background portion of the image data.

2. The robotic system of claim 1, wherein the processor circuitry is further operable to generate the model of the state of the multi-fingered soft gripper by:
deriving the optical flow as an active optical flow by limiting the derivation to pixels of the image data that are along a direction of an expected motion and within a predefined depth range from the image sensor.

3. The robotic system of claim 2, wherein the processor circuitry is further operable to generate the model of the state of the multi-fingered soft gripper by:
deriving the active optical flow by limiting the derivation to the pixels of the image data having a motion gradient magnitude that is above a predetermined stability threshold.

4. The robotic system of claim 1, wherein the processor circuitry is further operable to generate the model of the state of the multi-fingered soft gripper by:
determining a discrete total motion for each pixel of the image data by summing a magnitude of a motion vector along a trajectory of the predefined motion pattern; and
segmenting pixels of the image data between the multi-fingered soft gripper portion and the background portion of the image data based on the discrete total motions.

5. The robotic system of claim 1, wherein the processor circuitry is further operable to control the arm with the multi-fingered soft gripper to manipulate an object based on the model of the state of the multi-fingered soft gripper.

6. The robotic system of claim 1, wherein the predefined motion pattern comprises rotation around an optical axis of the image sensor or translational motion along the optical axis of the image sensor.

7. The robotic system of claim 1, wherein the predefined motion pattern comprises a figure-eight motion pattern.

8. The robotic system of claim 1, wherein the image sensor comprises a single camera having a lens with a field-of-view wide enough to capture image data of all fingers of the multi-fingered soft gripper simultaneously.

9. The robotic system of claim 1, wherein the processor circuitry is further operable to generate the model of the state of the multi-fingered soft gripper by:
computing a convex hull for each contour denoting a respective finger of the multi-fingered soft gripper, wherein the convex hull is a subset of points defining rays connecting a center of mass of the respective finger in the image data.

10. The robotic system of claim 1, wherein the processor circuitry is further operable to generate the model of the state of the multi-fingered soft gripper by:

prior to deriving the optical flow, transforming the image data from color image data to lightness value image data.

11. A component of a robotic system, wherein the robotic system includes a robot having an arm with a multi-fingered soft gripper, and an image sensor fixedly mounted on the arm to move with the multi-fingered soft gripper that is formed of a compliant material, and operable to capture image data of the multi-fingered soft gripper, the component comprising:

processor circuitry;

a non-transitory computer-readable storage medium including instructions that, when executed by the processor circuitry, cause the processor circuitry to generate a model of a state of the multi-fingered soft gripper by:

controlling the arm to move in a predefined motion pattern while the image sensor captures the image data;

deriving an optical flow based on the image data and consecutive arm kinematic and velocity frame states; and segmenting between a multi-fingered soft gripper portion and a background portion of the image data based on the optical flow, wherein static regions of the optical flow represent the multi-fingered soft gripper portion, dynamic regions of the optical flow represent the background portion, and non-coherent regions of the optical flow represent contour between the multi-fingered soft gripper portion and the background portion of the image data.

12. The component of claim 11, wherein the processor circuitry is further operable to generate the model of the state of the multi-fingered soft gripper by:

deriving the optical flow as an active optical flow by limiting the derivation to pixels of the image data that are along a direction of an expected motion and within a predefined depth range from the image sensor.

13. The component of claim 12, wherein the processor circuitry is further operable to generate the model of the state of the multi-fingered soft gripper by:

deriving the active optical flow by limiting the derivation to the pixels of the image data having a motion gradient magnitude that is above a predetermined stability threshold.

14. The component of claim 11, wherein the processor circuitry is further operable to generate the model of the state of the multi-fingered soft gripper by:

determining a discrete total motion for each pixel of the image data by summing a magnitude of a motion vector along a trajectory of the predefined motion pattern; and segmenting pixels of the image data between the multi-fingered soft gripper portion and the background portion of the image data based on the discrete total motions.

15. The component of claim 11, wherein the processor circuitry is further operable to control the arm with the multi-fingered soft gripper to manipulate an object based on the model of the state of the multi-fingered soft gripper.

16. The component of claim 11, wherein the predefined motion pattern comprises rotation around an optical axis of the image sensor or translational motion along the optical axis of the image sensor.

17. The component of claim 11, wherein the predefined motion pattern comprises a figure-eight motion pattern.

18. The component of claim 11, wherein the image sensor comprises a single camera having a lens with a field-of-view wide enough to capture image data of all fingers of the multi-fingered soft gripper simultaneously.

19. The component of claim 11, wherein the processor circuitry is further operable to generate the model of the state of the multi-fingered soft gripper by:

computing a convex hull for each contour denoting a respective finger of the multi-fingered soft gripper, wherein the convex hull is a subset of points defining rays connecting a center of mass of the respective finger in the image data.

20. The component of claim 11, wherein the processor circuitry is further operable to generate the model of the state of the multi-fingered soft gripper by:

prior to deriving the optical flow, transforming the image data from color image data to lightness value image data.

* * * * *